(12) United States Patent
Rozman et al.

(10) Patent No.: US 9,771,164 B2
(45) Date of Patent: Sep. 26, 2017

(54) ELECTRIC SYSTEM ARCHITECTURE INCLUDED IN A MORE-ELECTRIC ENGINE (MEE) SYSTEM

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Jason B. Solomonides, Cromwell, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 424 days.

(21) Appl. No.: 14/524,139

(22) Filed: Oct. 27, 2014

(65) Prior Publication Data
US 2016/0114899 A1    Apr. 28, 2016

(51) Int. Cl.
*B64D 41/00*    (2006.01)
*F02C 7/32*    (2006.01)
(Continued)

(52) U.S. Cl.
CPC ............. *B64D 41/00* (2013.01); *F01D 15/10* (2013.01); *F02C 7/32* (2013.01); *H02J 4/00* (2013.01); *B64D 2221/00* (2013.01); *Y02T 50/54* (2013.01)

(58) Field of Classification Search
CPC ....... B64D 41/00; B64D 2221/00; H02J 4/00; H02J 1/06; H02J 1/00; F01D 15/10; F02C 7/32
See application file for complete search history.

(56) References Cited

U.S. PATENT DOCUMENTS 5,451,141 A    9/1995    Carvalho et al.
5,481,648 A    1/1996    Volponi et al.
(Continued)

FOREIGN PATENT DOCUMENTS

FR    2959279 A1    10/2011
WO    9428608 A1    12/1994

OTHER PUBLICATIONS

European Search Report; EP Application No. 15 19 1761; Date of Mailing: Dec. 7, 2015; 7 pages.

*Primary Examiner* — Ryan Johnson
(74) *Attorney, Agent, or Firm* — Cantor Colburn LLP

(57) ABSTRACT

A more-electric engine (MEE) system configured to operate in a plurality of operating modes includes a first power generating sub-system and a second power generating sub-system. The first power generating sub-system is configured to output electric power to a first power bus. The second power generating sub-system is configured to output electric power to a second power bus. The MEE system further includes an electronic source/load management and distribution (SLMD) module in power and signal communication with each of the first power generating sub-system, the second power generating sub-system, and the plurality of electrical sub-systems. The electronic SLMD module is configured to selectively operate the MEE system in one of a first operating mode or a second operating mode among the plurality of operating modes. The first and second operating modes adjust the delivery of the first and second electric power to the first and second power buses.

9 Claims, 11 Drawing Sheets

(51) Int. Cl.
*F01D 15/10* (2006.01)
*H02J 4/00* (2006.01)

(56) References Cited

U.S. PATENT DOCUMENTS

| | | | |
|---|---|---|---|
| 6,011,377 | A | 1/2000 | Heglund et al. |
| 6,992,403 | B1 * | 1/2006 | Raad ..................... F02C 7/275 |
| | | | 290/10 |
| 7,777,384 | B2 | 8/2010 | Gieras et al. |
| 7,852,049 | B2 | 12/2010 | Maddali et al. |
| 8,076,882 | B2 | 12/2011 | Dooley et al. |
| 8,134,331 | B2 | 3/2012 | Rozman et al. |
| 8,148,867 | B2 | 4/2012 | Gieras et al. |
| 8,162,611 | B2 | 4/2012 | Perkinson et al. |
| 8,209,107 | B2 | 6/2012 | Rozman et al. |
| 8,213,136 | B2 | 7/2012 | Maddali et al. |
| 8,217,616 | B2 | 7/2012 | Rozman et al. |
| 8,237,416 | B2 | 8/2012 | Rozman et al. |
| 8,319,369 | B2 | 11/2012 | Rozman et al. |
| 8,344,544 | B2 | 1/2013 | Rozman et al. |
| 8,390,151 | B2 | 3/2013 | Rozman et al. |
| 8,390,160 | B2 | 3/2013 | Gieras et al. |
| 8,461,732 | B2 | 6/2013 | Gieras et al. |
| 8,519,686 | B2 | 8/2013 | Rozman et al. |
| 8,553,373 | B2 | 10/2013 | Rozman et al. |
| 8,625,243 | B2 | 1/2014 | Rozman et al. |
| 9,394,084 | B1 * | 7/2016 | Edwards ............. H02P 29/0243 |
| 2010/0068056 | A1 | 3/2010 | Gainford et al. |
| 2014/0032002 | A1 | 1/2014 | Iwashima et al. |
| 2014/0191606 | A1 | 7/2014 | Gieras et al. |
| 2014/0265693 | A1 | 9/2014 | Gieras et al. |
| 2014/0265744 | A1 | 9/2014 | Rozman et al. |
| 2014/0265747 | A1 | 9/2014 | Rozman et al. |
| 2014/0266076 | A1 | 9/2014 | Rozman et al. |
| 2014/0266078 | A1 | 9/2014 | Rozman et al. |

* cited by examiner

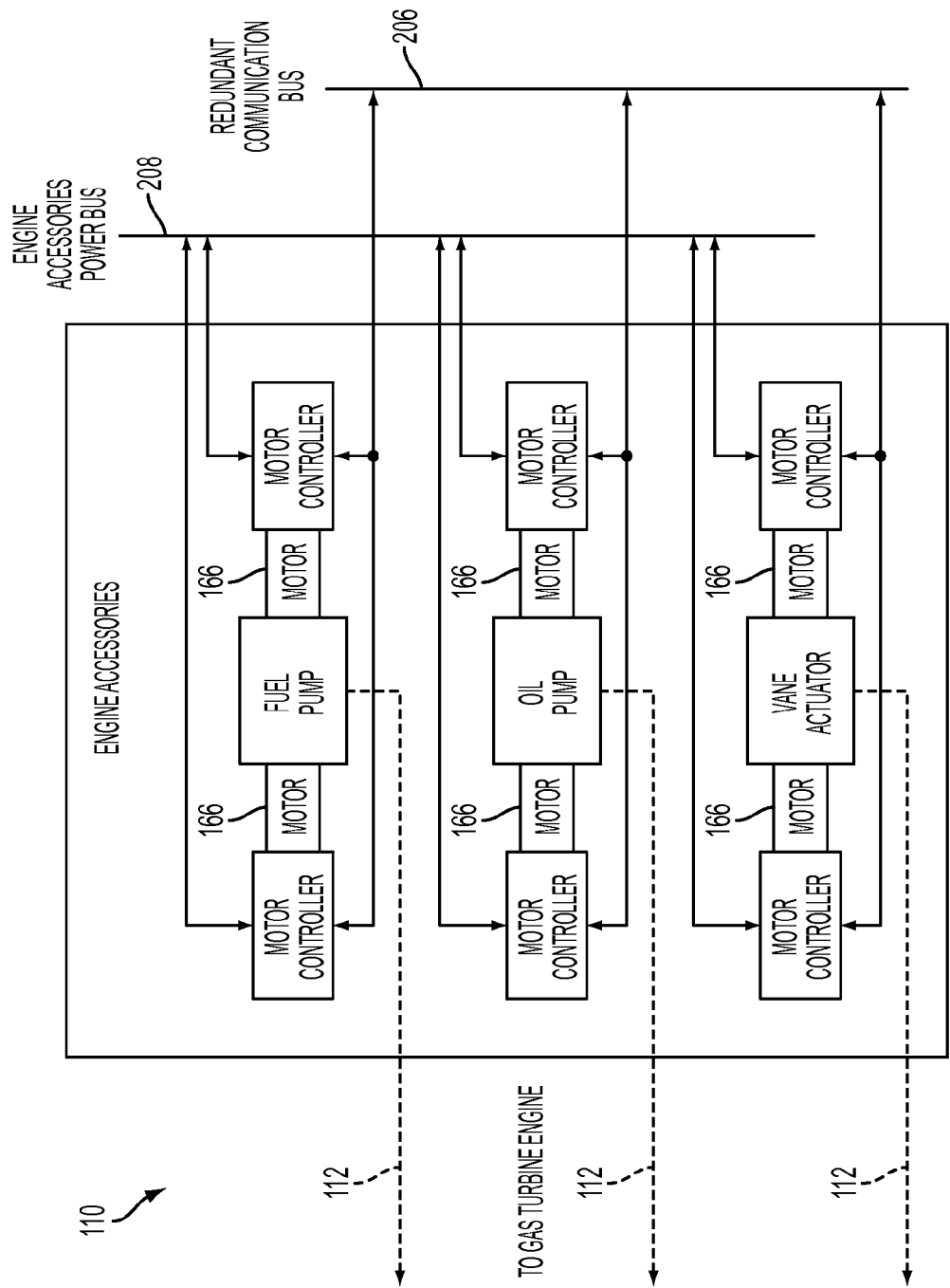

ELECTRIC SYSTEM ARCHITECTURE INCLUDED IN A MORE-ELECTRIC ENGINE (MEE) SYSTEM

TECHNICAL FIELD

The present invention relates generally to more-electric engine (MEE) systems, and more particularly, to an electronic system architecture included in a MEE system.

BACKGROUND

Recent trends in the aircraft industry to pursue lighter and more efficient aircraft have led to the development of more-electric aircraft (MEA) and more-electric engine (MEE) systems. These traditional MEA systems replace are intended to replace one or more the pneumatic systems with electrically powered systems. On traditional pneumatic systems, for example, the Environmental Control System (ECS) and Wing Ice Protection System (IPS) rely on mechanical pneumatic architectures that utilize hot air bled from the engine to 'power' the respective system. When implements the same systems in a MEA system, however, bleed air is not required because the systems are electrically driven.

Conventional MEE systems include gearbox driven engine accessories, a primary power generating system that exclusively powers only the engine system, and a secondary power generating system that exclusively powers only pitch propeller. Therefore, each of the primary power generating system and the secondary power generating system traditionally require their own respective back up generating systems, which increases the costs, weight, and complexity of conventional MEE systems.

SUMMARY

According to a non-limiting embodiment, a more-electric engine (MEE) system configured to operate in a plurality of operating modes includes a first power generating sub-system and a second power generating sub-system. The first power generating sub-system is configured to output electric power to a first power bus. The second power generating sub-system is configured to output electric power to a second power bus. The MEE system further includes an electronic source/load management and distribution (SLMD) module in power and signal communication with each of the first power generating sub-system, the second power generating sub-system, and the plurality of electrical sub-systems. The electronic SLMD module is configured to selectively operate the MEE system in one of a first operating mode or a second operating mode among the plurality of operating modes. The first and second operating modes adjust the delivery of the first and second electric power to first and second power buses that are electrically connected to first and second electrical sub-systems, respectively.

According to another non-limiting embodiment, a method of controlling a more-electric engine (MEE) system comprises outputting electric power to a first power bus using a first power generating sub-system, and outputting electric power to a second power bus different from the first power bus using a second power generating sub-system different from the first power generating sub-system. The method further includes selectively operating the MEE system in one of a first operating mode or a second operating mode among the plurality of operating modes. The first and second operating modes adjust the delivery of electric power to the first and second power buses electrically connected to first and second electrical sub-systems.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a block diagram of an electronic engine accessory control module 110 according to a non-limiting embodiment of the disclosure;

DETAILED DESCRIPTION OF THE INVENTION

Figure 1:
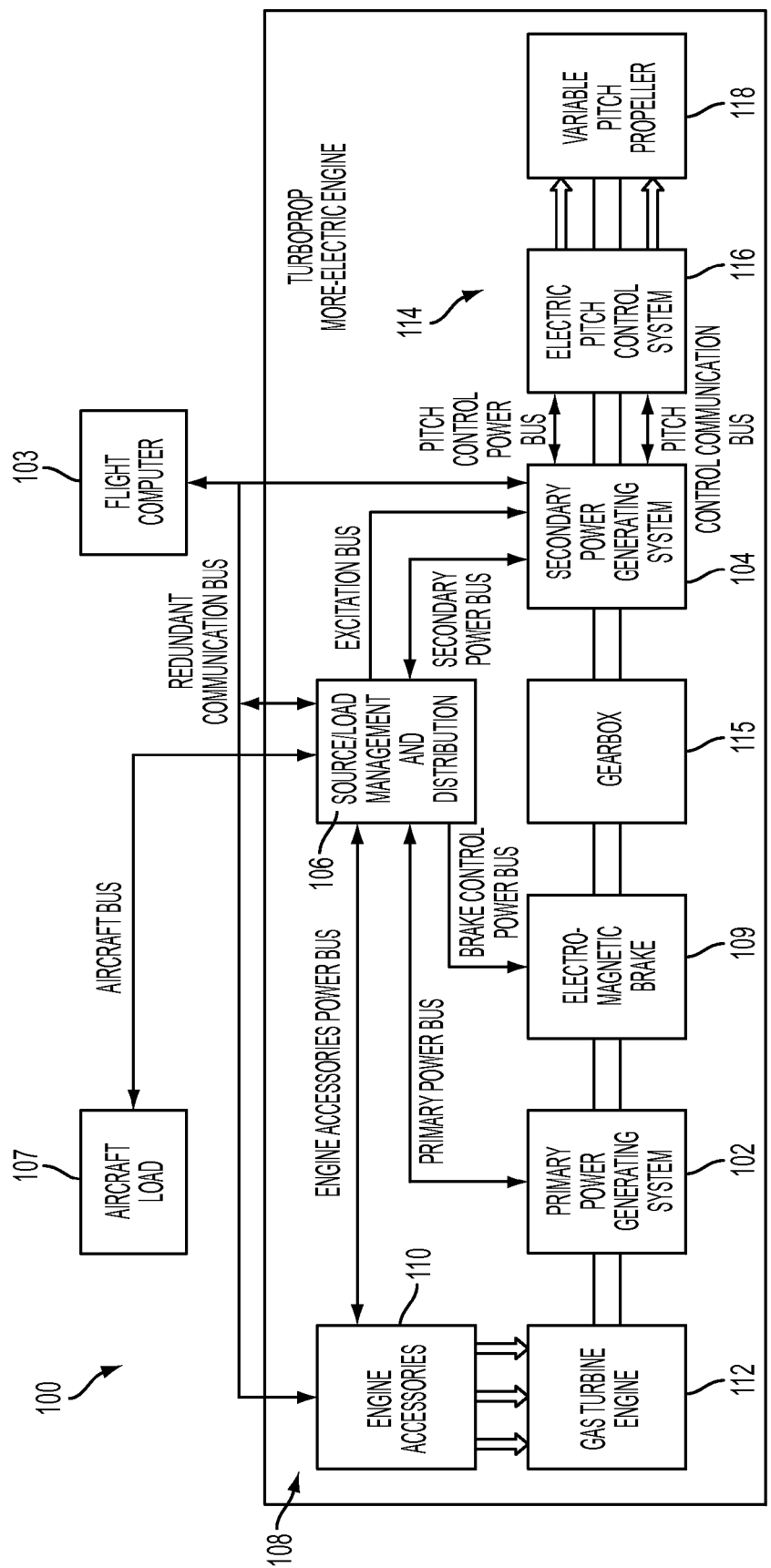
FIG. 1 is a block diagram of a MEE system according to a non-limiting embodiment of the disclosure.

Referring to FIG. 1, a more-electric engine (MEE) system 100 is illustrated according to a non-limiting embodiment of the disclosure. The MEE system 100 can be implemented in an aircraft vehicle, for example, and configured to distribute power to various electrical sub-systems of the aircraft. According to a non-limiting embodiment, the MEE system 100 is configured to operate in a plurality of operating modes to control the manner in which power is distributed to the various aircraft electrical sub-systems. For example, the operating mode of the MEE system 100 can be switched between in a first operating mode (e.g., a normal mode) and a second operating mode (e.g., an auxiliary mode), as discussed in greater detail below. A system control module 103 (e.g., a flight control module) can be provided to execute various control decisions related to fault tolerant operation, power quality, and operating mode decisions.

The MEE system 100 includes a first power generating sub-system 102, a second power generating sub-system 104, and an electronic source/load management and distribution (SLMD) module 106. The first power generating sub-system 102 is configured to output electric power to a first power bus that drives a first electrical sub-system 108. According to an embodiment, the first power generating sub-system 102 includes a switched reluctance machine driven by a high-speed rotatable shaft (not shown) and a power converter. The first electrical sub-system 108 includes an electronic engine accessory control module 110 to support operation of a turbine engine 112. The electronic engine accessory control module 110 is configured to output one or more electrical signal for controlling the turbine engine 112 along with various engine system components including, but not limited to, a fuel pump, an oil pump, a vane actuator.

According to an embodiment, the MEE system 100 includes an electromagnetic brake assembly 109 in electrical communication with the 106. The electromagnetic brake assembly 109 is configured to reduce the rotating speed of the high-speed shaft if necessary. For instance, engine blades are driven by the airflow and resulting torque is transmitted to the core engine which causes the engine to realize an over-speed event, which can increase rotational speed beyond design limits. The electromagnetic brake assembly 109 can be used to prevent the turboprop engine to the over-speed that may occur during the angle transition (pitch change) of the blades.

The second power generating sub-system 104 is different from the first power generating sub-system 102 and is configured to output electric power on a second power bus that drives a second electrical sub-system 114. According to an embodiment, the second power generating sub-system 102 is assembled as a wound field synchronous generator that is driven by a low-speed shaft at the output of the speed reduction gearbox 115 The second electrical sub-system 114 includes a variable propeller pitch sub-system 114, for example, having an electronic pitch control module 116 in electrical communication with one or more variably pitch aircraft propellers 118. The electronic pitch control module 116 is powered by the secondary power generating system 104 that controls the position and/or pitch of the aircraft propeller 118 as understood by one of ordinary skill in the art.

The electronic SLMD module 106 provides distribution of electric power on the power buses connected to the first electrical sub-system 108, the second electrical sub-system 114, and other electrical loads 107 connected to the MEE system 100. The electronic SLMD module 106 is configured to selectively operate the MEE system 100 in either the first operating mode or the second operating mode. The first and second operating modes adjust the delivery of the first and second powers to the first electrical sub-system 108 and the second electrical sub-system 114. According to a non-limiting embodiment, the SLMD module 106 is configured to determine whether the MEE system 100 is operating normally or whether a fault exists based on the first power output from the first power generating sub-system 102 and/or the second power output from the second power generating sub-system 104. For example, when each of the first power and the second power are greater than or equal to a power threshold value, the SLMD module 106 determines the MEE system 100 is operating normally. When, however, either the first power or the second power is less than to the power threshold value, the SLMD module 106 determines a fault exists in the MEE system 100. Accordingly, the SLMD module 106 initializes the first operating mode when the MEE system 100 operating normal, and initializes the second operating mode when one or faults exists in the MEE system 100. It is appreciated that individual power thresholds can be assigned to the first power generating sub-system 102 and the second power generating sub-system 104, respectively. Thus, the first power generating sub-system 102 is determined faulty when electric power level of the first power bus is less than a first power threshold value, for example, and the second power generating sub-system 104 is determined faulty when electric power of the second power bus is less than a second power threshold value. It is also appreciated that the first and second power threshold values can be set equal, or can be set as different values.

When the first operating mode is initiated, the electronic SLMD module 106 distributes the first and second powers independently to the first electrical sub-system 108 and the second electrical sub-system 114, respectively. When the second operation mode is initiated, however, the electronic SLMD module 106 commonly distributes one of the first or second powers to each of the first electrical sub-system 108 and the second electrical sub-system 114. According to a non-limiting embodiment, the electronic SLMD module 106 connects the first power generating sub-system 102 to both the first electrical sub-system 108 and the second electrical sub-system 114 in response to initializing the second operating mode. According to another non-limiting embodiment, for example, the electronic SLMD module 106 connects the second power generating sub-system 104 to both the first electrical sub-system 108 and the second electrical sub-system 114 in response to initializing the second operating mode.

The electronic SLMD module 106 is also configured to adjust the power level generated by the first power generating sub-system 102 and the second power generating sub-system 104 based on the operating mode of the MEE system 100. For example, the SLMD module 106 can output a signal commanding the first power generating sub-system 102 and the second power generating sub-system 104 to output electric power to the first and second power buses, respectively, at a percentage of the total available power in response to initiating the first operating mode. When the second operation mode is initiated, however, the electronic SLMD module 106 can output a signal that commands either the first power generating sub-system 102 or the second power generating sub-system 104 to output electric power to the first or second power buses, respectively, at full power (e.g., 100%). Full power is then commonly distributed to the first electrical sub-system 108 or the second electrical sub-system 114 as described above.

Figure 2:
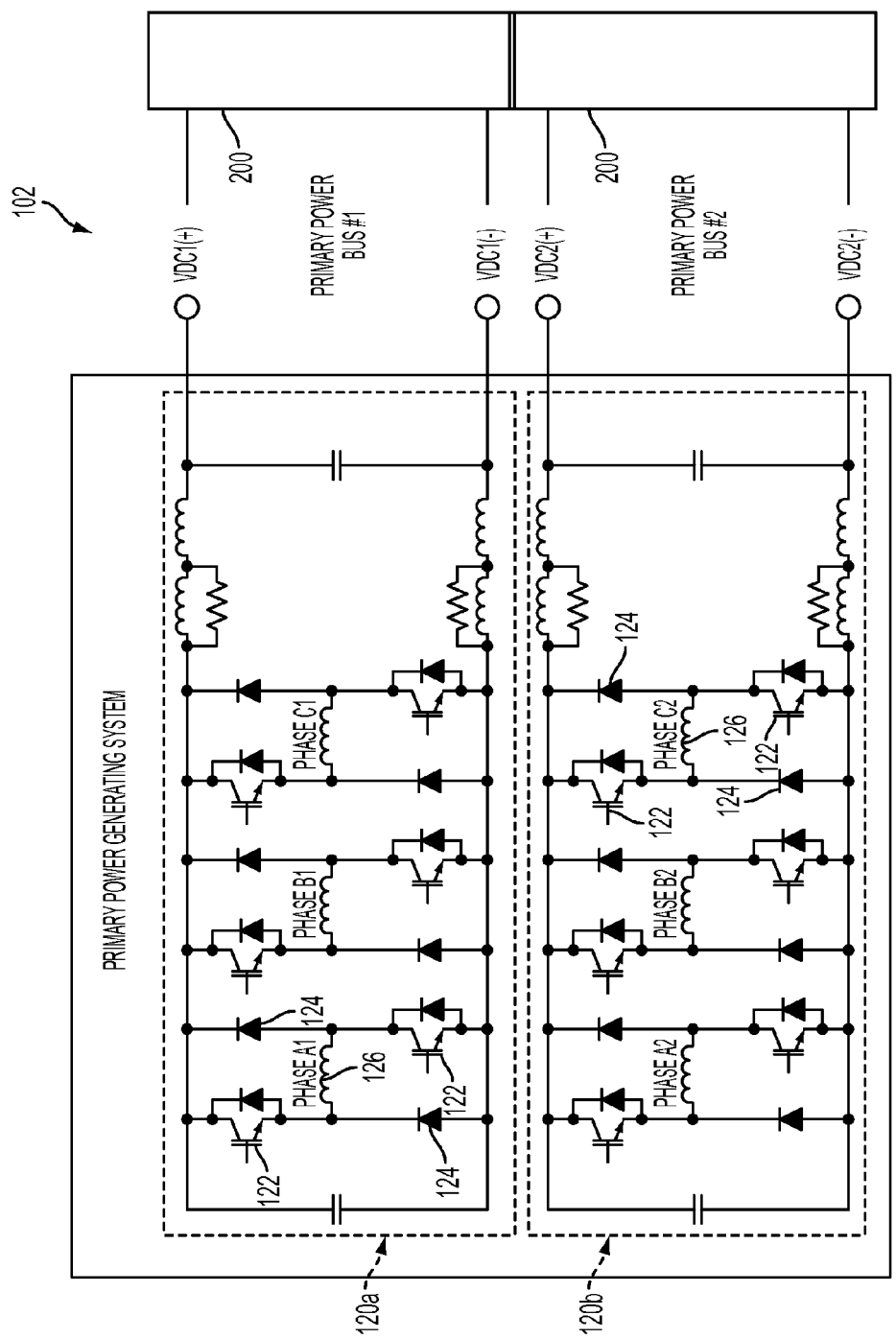
FIG. 2 is an electrical schematic diagram of a primary power generator sub-system according to a non-limiting embodiment of the disclosure.

Turning now to FIG. 2, an electrical schematic diagram of a primary power generator sub-system 102 is illustrated according to a non-limiting embodiment. The primary power generator sub-system 102 is in electrical communication with the SLMD module 106 via one or more primary power buses 200. The primary power generator sub-system 102 includes a fault tolerant multi-phase switched reluctance starter/generator. For example, the primary power generator sub-system 102 can be assembled as a pair of three-phase systems 120a/120b, which define a six-phase switched reluctance starter/generator. Although six phases are illustrated, the number of phases are not limited thereto. Each phase operates completely independent of one another electrically, and magnetically. The primary power generator sub-system 102 can operate reliably at high speeds (e.g., greater than approximately 20,000 rpm) and in a high temperature environment. Operating at high speeds enables smaller weight/size design of electric power generating system.

Each phase includes a plurality of switching devices 122 and diodes 124 in electrical connection with an inductive load 126. The switching devices include, for example, SiC power devices 122, which enable integration of power converter into housing of primary power generator sub-system 102. Accordingly, the primary power generator sub-system 102 delivers electric power to the electronic SLMD module 106 when the first operating mode is enabled. According to a non-limiting embodiment, the primary power generator sub-system 102 is configured to operate as an inverter which can effectively operate the primary power generator sub-system 102 as a motor to start the engine 112. It is appreciated that battery power can also be provided to facilitate engine start-up as understood by one of ordinary skill in the art.

Figure 3A:
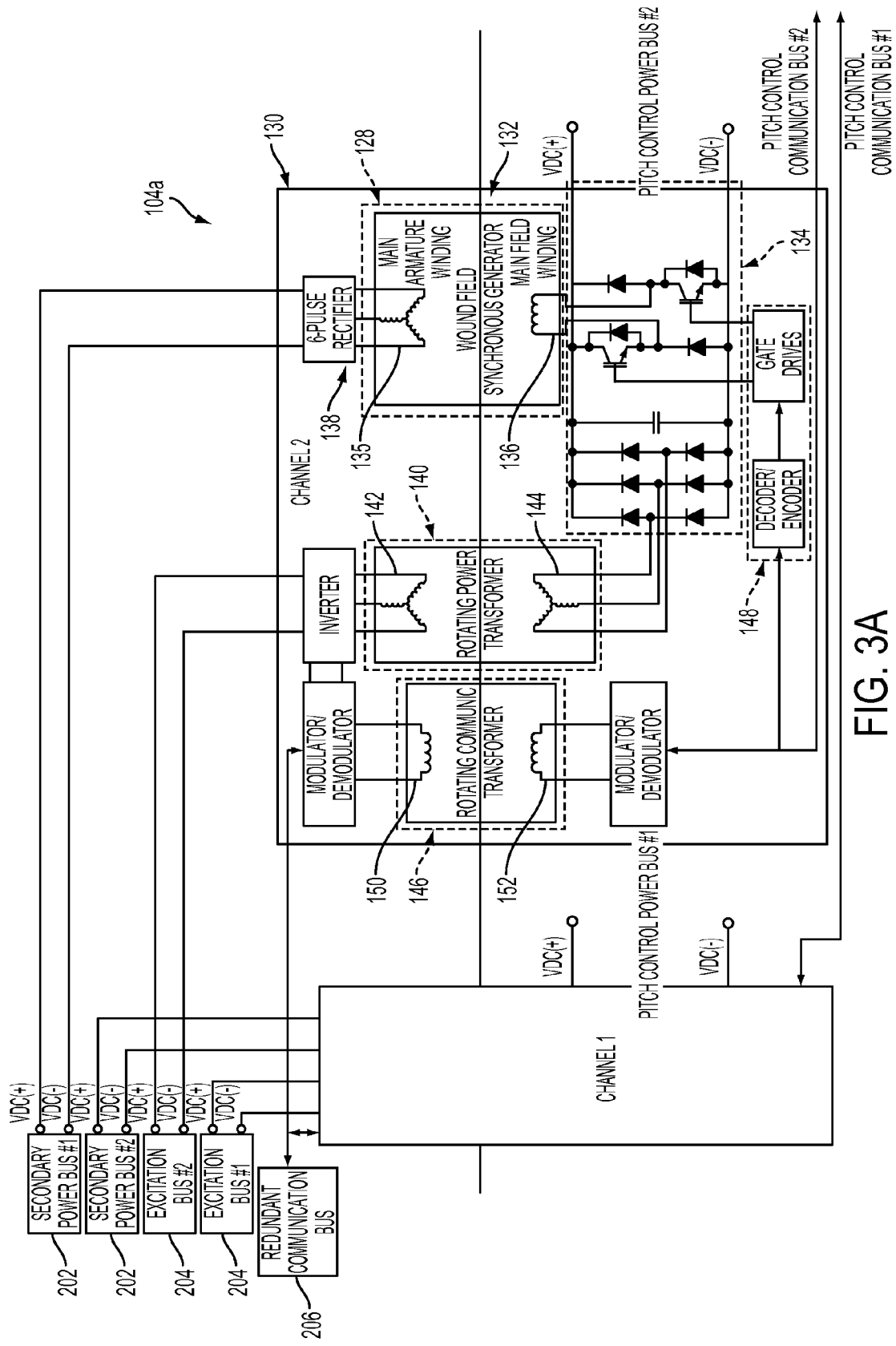
FIG. 3A is an electrical block diagram of a secondary power generating sub-system according to a non-limiting embodiment of the disclosure.

Referring now to FIG. 3A, an electrical block diagram of a secondary power generating sub-system 104*a* is illustrated according to a non-limiting embodiment. The secondary power generating sub-system 104*a* is in electrical communication with the electronic SLMD module 106 via one or more secondary power buses 202, one or more excitation power buses 204, and/or one or more redundant communication buses 206. The electronic SLMD module 106 includes a wound field synchronous generator unit 128 driven by a common low-speed shaft (not shown). The lower operating speed provided by the low-speed shaft allows for consistent and reliable operation of the wound field synchronous generator unit 128. The wound field synchronous generator unit 128 includes a main armature winding 135 installed on a stationary frame 130 and a rotating main field winding 136 installed on a rotating frame 132. The current flowing through the main field winding 136 is regulated in response to a DC bus voltage at the output of a six-pulse rectifier circuit 138. According to at least one embodiment, the second power generating sub-system 104*a* is in electrical communication with the electronic SLMD module 106. In this manner, the second power generating sub-system 104*a* is configured to control regenerative power from the second electrical sub-system 114 (e.g., the variable propeller pitch sub-system) to the SLMD module 106 by controlling current flow through the main field winding 136.

The wound field synchronous generator unit 128 further includes a rotating power transformer 140. The rotating power transformer 140 includes a stationary winding 142 installed on the stationary frame 130 that transfers power to a rotating winding 144 installed on the rotating frame 132. The output power received at the rotating winding 144 is rectified by the rotating power converter 134, which is in electrical communication with the second electrical sub-system 114 (e.g., the variable propeller pitch sub-system). In this manner, the DC power output from the rotating power converter 134 can power the electronic pitch control module 116.

The secondary power generating sub-system 104*a* further includes a rotating communication transformer 146. The rotating power converter 134 controls current flowing through the main field winding 136. The current control is based on a control signal output from a decoder/encoder unit 148. For example, the rotating communication transformer 146 includes a primary winding 150 and a secondary winding 152. Electrical communication between the SLMD module 106 and the secondary power generating sub-system 104*a* is achieved by modulating a signal applied to the primary winding 150 using a first modulator/demodulator unit 154. The signal received at the secondary winding 152 is then demodulated by a second modulator/demodulator unit 156 and passed to the decoder/encoder unit 148 for controlling current in the main field winding 136 of the wound field synchronous generator unit 128 by controlling duty cycle of single phase converter switches of the rotating power converter 134. The communication between the secondary power generating sub-system 104*a* and the SLMD module 106 is bidirectional to allow monitoring feedback signals by the system control module 103. Accordingly, the system control module 103 can execute various control decisions related to fault tolerant operation, power quality, and operating modes of the MEE system 100.

Figure 3B:
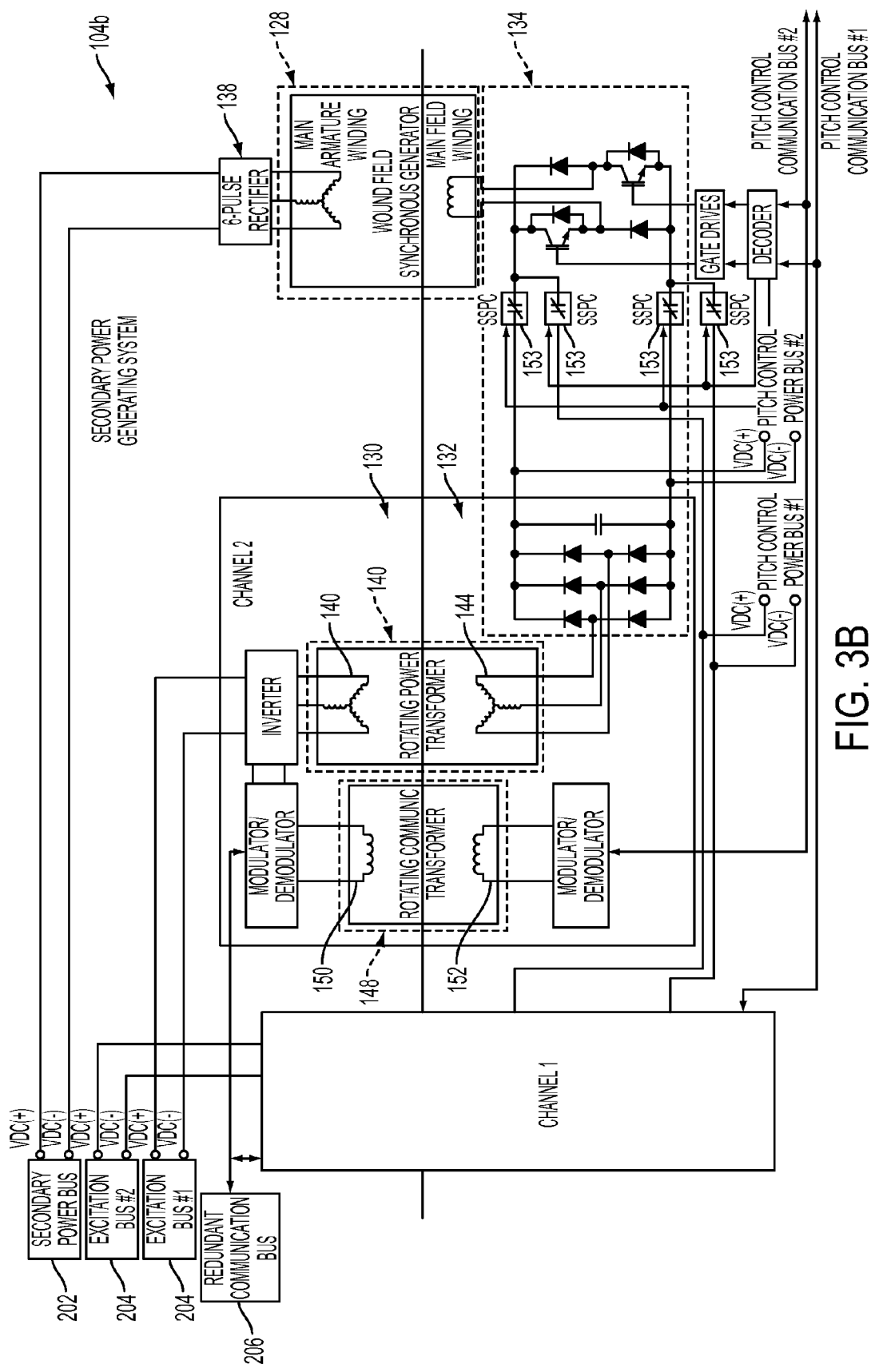
FIG. 3B is an electrical block diagram of a secondary power generating sub-system according to another non-limiting embodiment.

Turning to FIG. 3B, an electrical block diagram of a secondary power generating sub-system 104*b* is illustrated according to another non-limiting embodiment. In this embodiment, the second power generating sub-system 104*b* includes a single wound field synchronous generator that is controlled using solid state electronic power controllers (SSPCs) 153 from both rotating DC buses. In this manner, fault tolerant operation may be achieved.

Figure 3C:
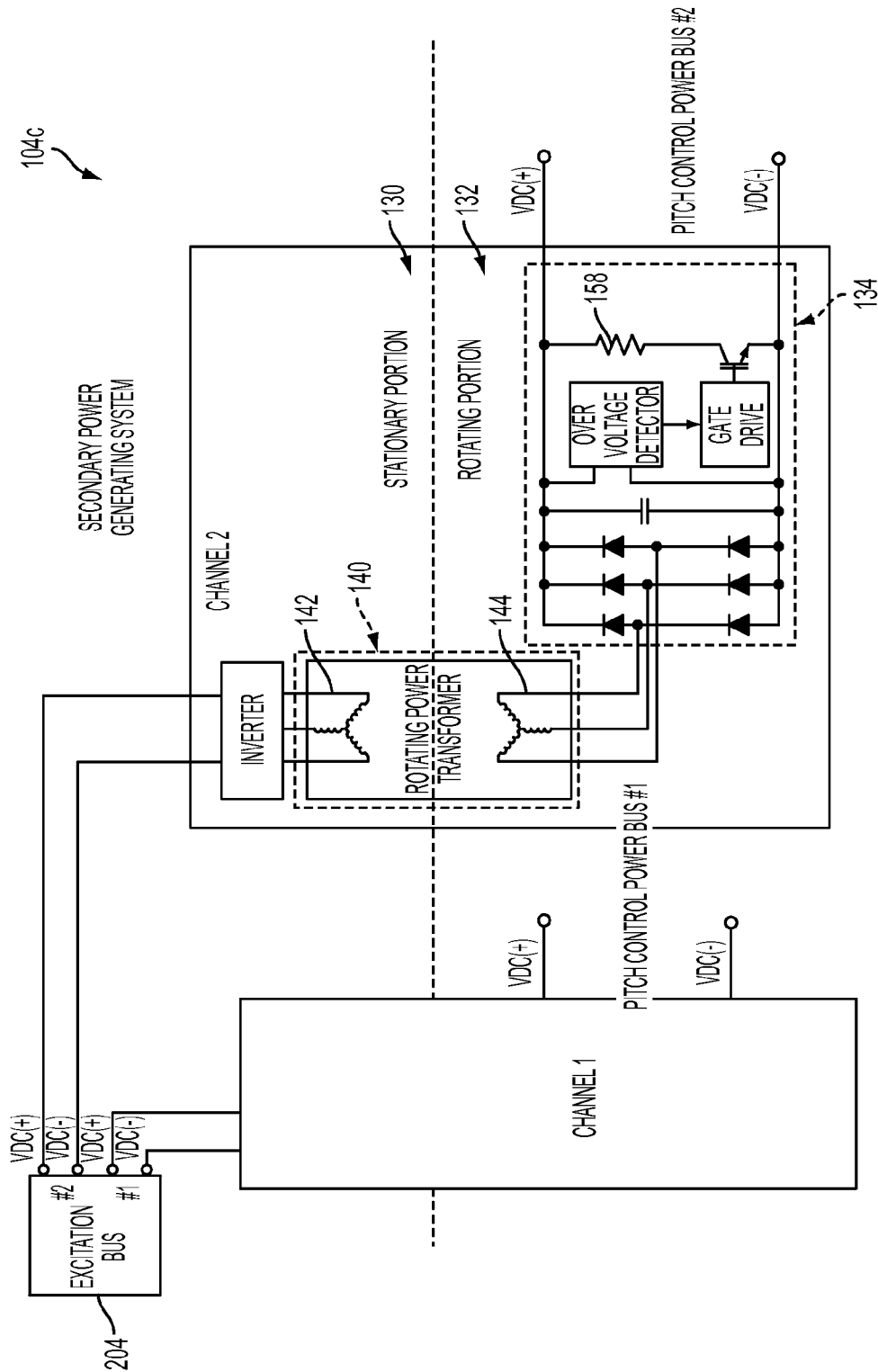
FIG. 3C is an electrical block diagram of a secondary power generating sub-system according to yet another non-limiting embodiment.

Turning to FIG. 3C, an electrical block diagram of a secondary power generating sub-system 104*c* is illustrated according to another non-limiting embodiment. In this embodiment, the secondary power generating sub-system 104*c* can be implemented as an auxiliary system to power the pitch control system if the primary power generating sub-system 102 is used and sized to support a plurality of sub-systems including, but not limited to, the first electrical sub-system 108 (e.g., the engine accessories module 110), the second electrical sub-system 114 (e.g., the electronic pitch control module 116), and an aircraft bus 201. The embodiment illustrated in FIG. 3C further includes power resistor 158 to dissipate regenerative power from electrical sub-system 114.

Figure 3D:
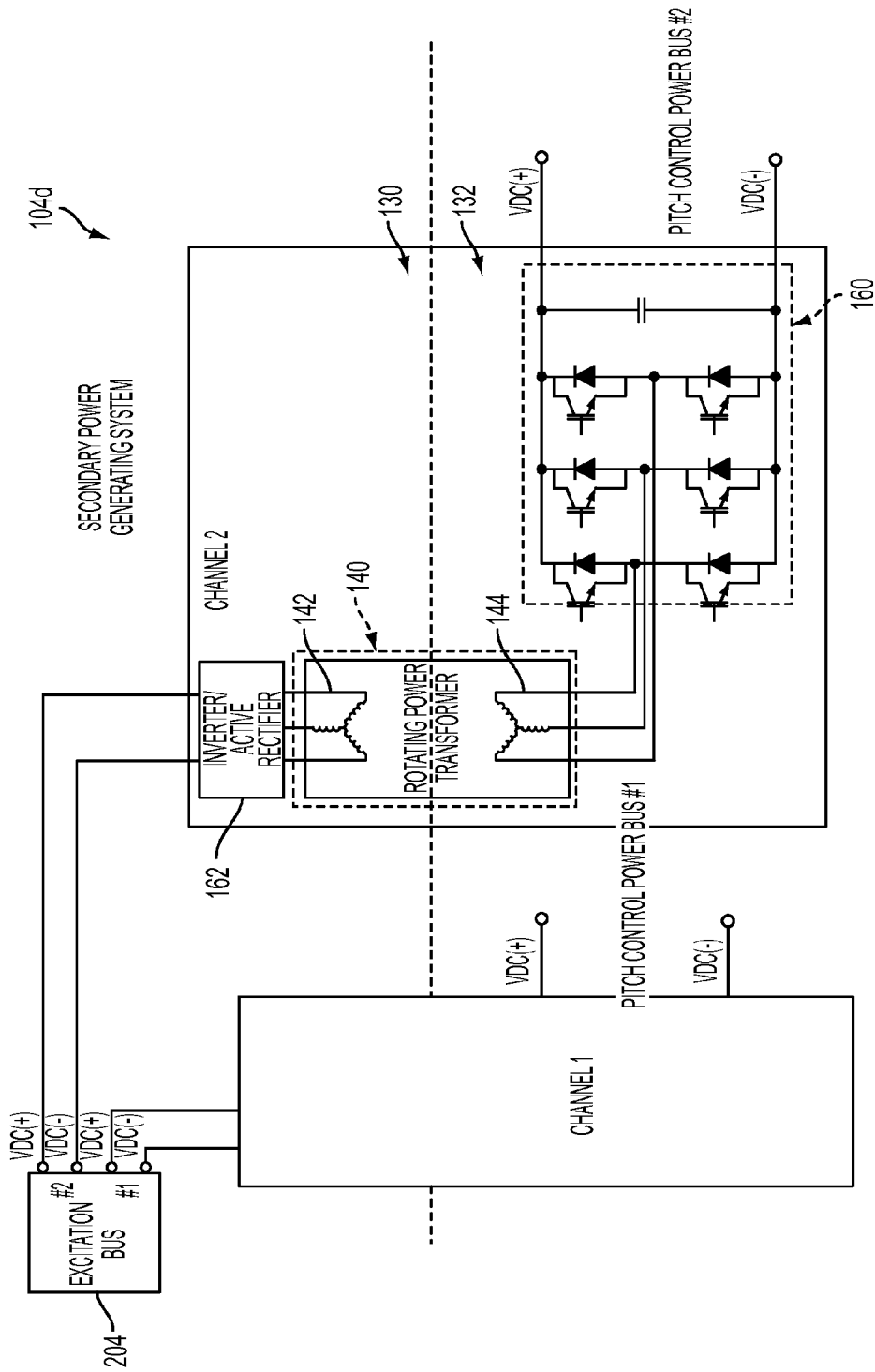
FIG. 3D is an electrical block diagram of a secondary power generating sub-system according to still another non-limiting embodiment.

Turning now to FIG. 3D, an electrical block diagram of a secondary power generating sub-system 104*d* is illustrated according to still another non-limiting embodiment. In this embodiment, the 6-pulse rotating power converter 134 is replaced with a rotating active rectifier circuit 160. In addition, an electronic inverter/active rectifier unit 162 is connected to the stationary winding 142. Accordingly, bi-directional power flow is achieved to deliver regenerative energy from the second electrical sub-system 114 (e.g., the variable propeller pitch sub-system) to the electronic SLMD module 106.

Figure 3E:
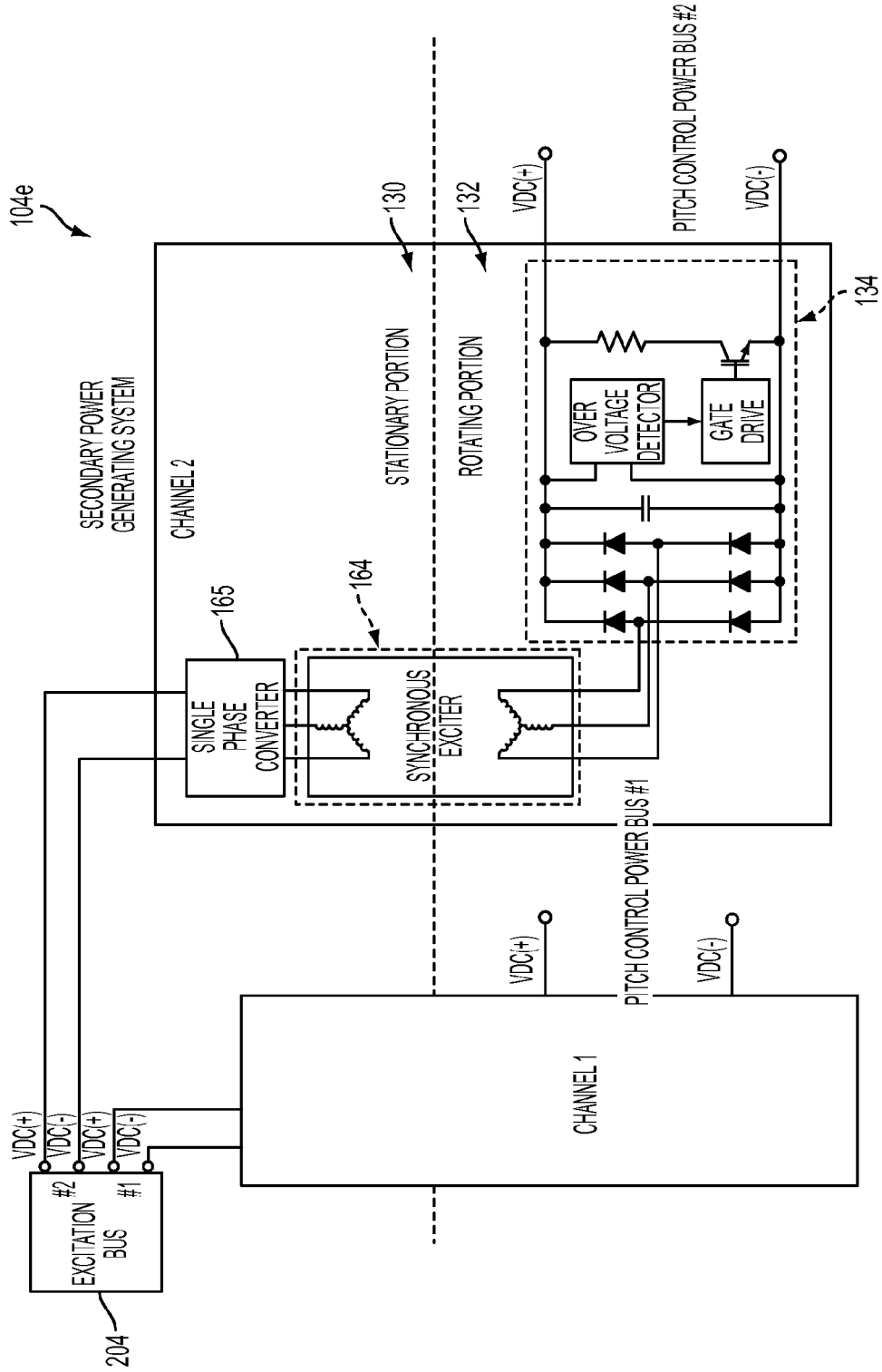
FIG. 3E is an electrical block diagram of a secondary power generating sub-system according to yet another non-limiting embodiment.

Turning now to FIG. 3E, an electrical block diagram of a secondary power generating sub-system 104*e* is illustrated according to still another non-limiting embodiment. In this embodiment, the rotating power transformer shown in FIGS. 3A-3D can be replaced by an electrical synchronous exciter 164. A single-phase converter circuit 165 regulates current in the excitation coil of synchronous exciter 164 in response to the pitch control power bus voltage to achieve its required level. The single-phase converter circuit 165 is configured as a two switch-two diode (2S-2D) topology shown in in block 134 of FIG. 3A.

Turning now to FIG. 4, a block diagram of an electronic engine accessory control module 110 is illustrated according to a non-limiting embodiment. The electronic engine accessory control module 110 is in electrical communication with the electronic SLMD module 106 via the redundant communication bus 206 and/or an engine accessories power bus 208. The electronic engine accessory control module 110 controls various engine accessories and engine components including, but not limited to, pumps, actuators, and valves driven by corresponding electric motors. For example, various electric motors receive corresponding electric signals from the electronic engine accessory control module 110 and utilizes dual redundancy due to flight critical functions. The motors can be switched reluctance (SR) or flux regulated PM machine (FRPMM) to enable de-excitation during faulty conditions and to maintain required fault tolerance. According to an embodiment, regenerative energy during actuator reversal can be delivered to the electronic SLMD module 106.

Figure 5:
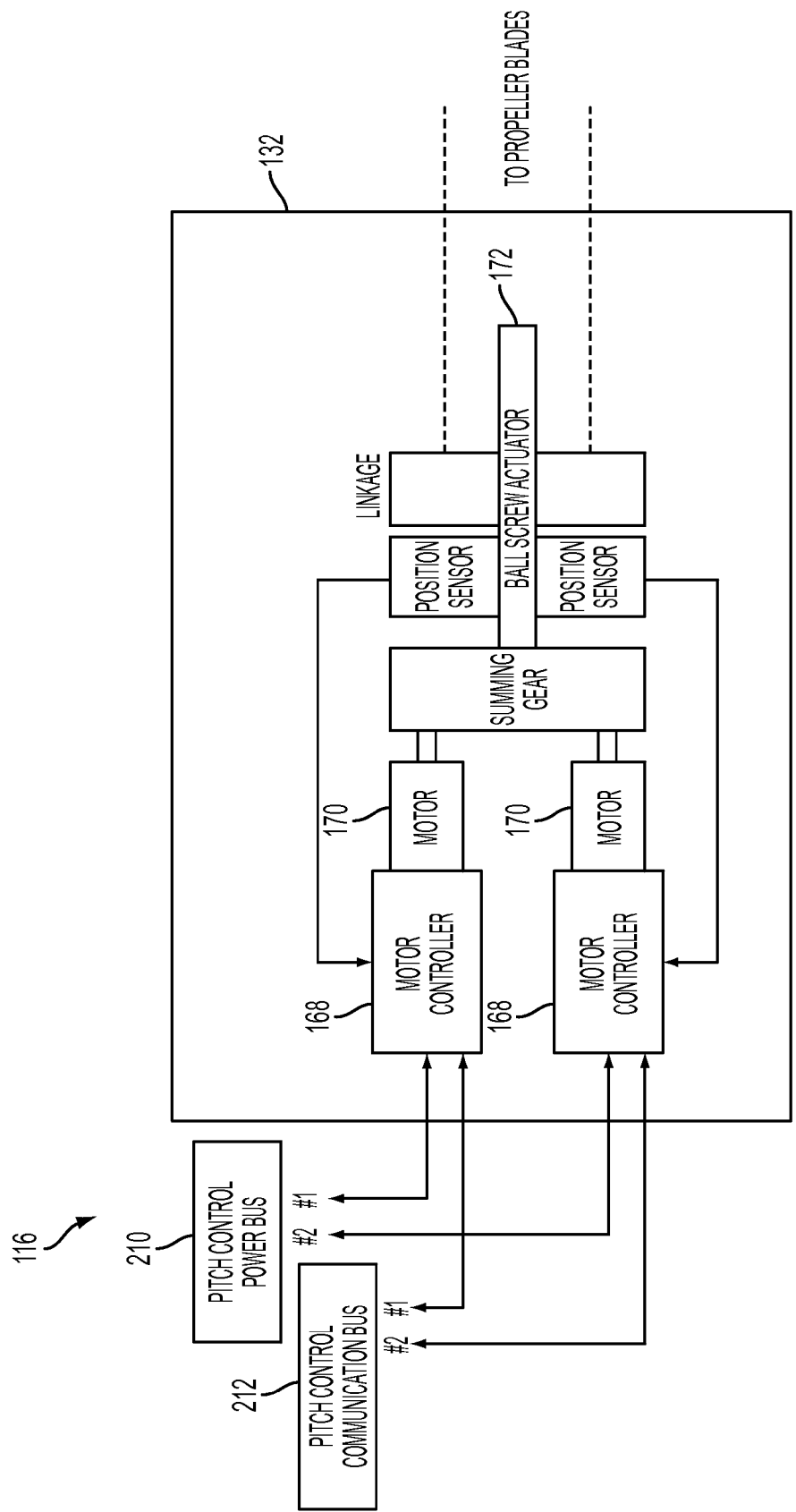
FIG. 5 is a block diagram of an electronic propeller pitch control module according to a non-limiting embodiment of the disclosure.

Referring to FIG. 5, a block diagram of an electronic pitch control module 116 is illustrated according to a non-limiting embodiment. The electronic pitch control module 116 is in electrical communication with the electronic SLMD module 106 via a pitch power bus 210 and/or a pitch communication bus 212. According to an embodiment, the 116 includes electric pitch control system includes redundant motor controllers 168 and AC pitch motors 170, which are installed at the rotating frame 132. The AC pitch motors 170 drive a ball screw actuator 172 to vary the pitch of one or more propeller blades (not shown). According to an embodiment, the AC pitch motors 170 can be switched reluctance (SR) or flux regulated PM machine (FRPMM) to achieve required fault tolerance and design commonality with engine motor-driven accessories.

Figure 6:
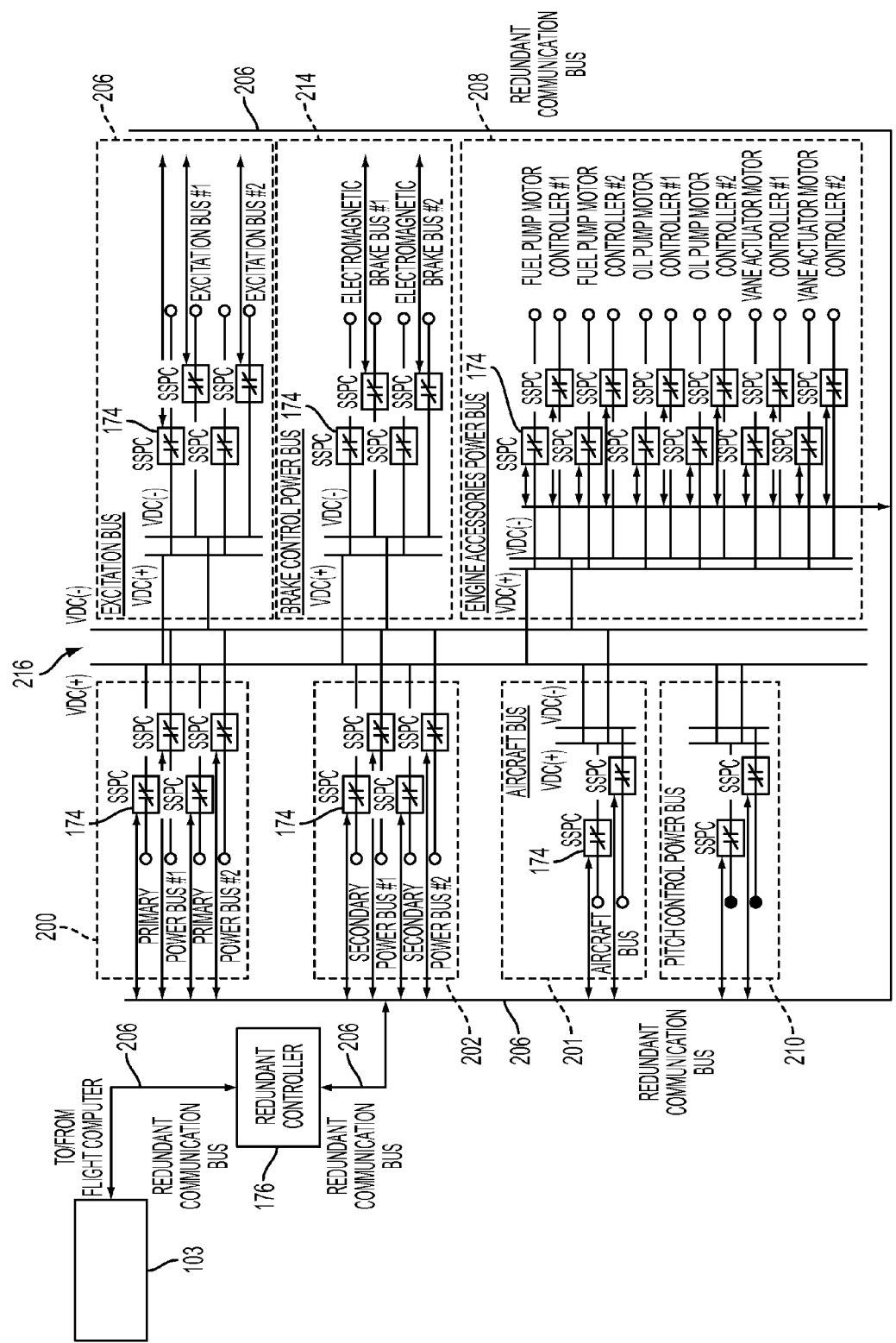
FIG. 6 is an electrical schematic diagram of an electronic source/load management and distribution (SLMD) module according to a non-limiting embodiment of the disclosure.

Turning now to FIG. 6, an electrical schematic diagram of an electronic SLMD module 106 is illustrated according to a non-limiting embodiment. The SLMD module 106 is in electrical communication with the 102, 103, 104, 107, 108, 109 and 114 via one more or more electrical bus connections. The bus connections include, but are not limited to, the primary power bus 200, the aircraft bus 201, the secondary power bus 202, the excitation bus 204, the engine accessories power bus 208, the pitch power bus 210, the pitch communication bus 212, and a brake control power bus 214. A main collector bus 216 including positive and negative rails may be connected to the various power buses 200,201, 202,210,212,206,214,208 to allow and/or power flow between one or more of the electrical modules (e.g., first power generating sub-system 102, second power generating sub-system 104) and/or electrical sub-systems (e.g., first electrical sub-system 108, second electrical sub-system 114). The SLMD module 106 includes various bus SSPCs 174 that control delivery of power between the collector bus 216 and the associated power modules. Control of the SSPCs is achieved via redundant communication bus 206. A redundant controller 176 provides supervisory control of source and load management and distribution within the turboprop MEE, and aircraft load 107, and communication interface between SLMD and system control module 103 (e.g., a flight control module).

The collector bus 216 receives power from primary and secondary power generating channels connected to the 102 and 104, respectively. A battery (not shown) may also be connected to an aircraft bus 201 to provide battery power that facilitates engine start up. According to a non-limiting embodiment, the collector bus 216 is a high voltage DC (HVDC) bus (e.g., approximately 270 Vdc) that allows reduction of system weight due to lower operating currents.

Figure 7:
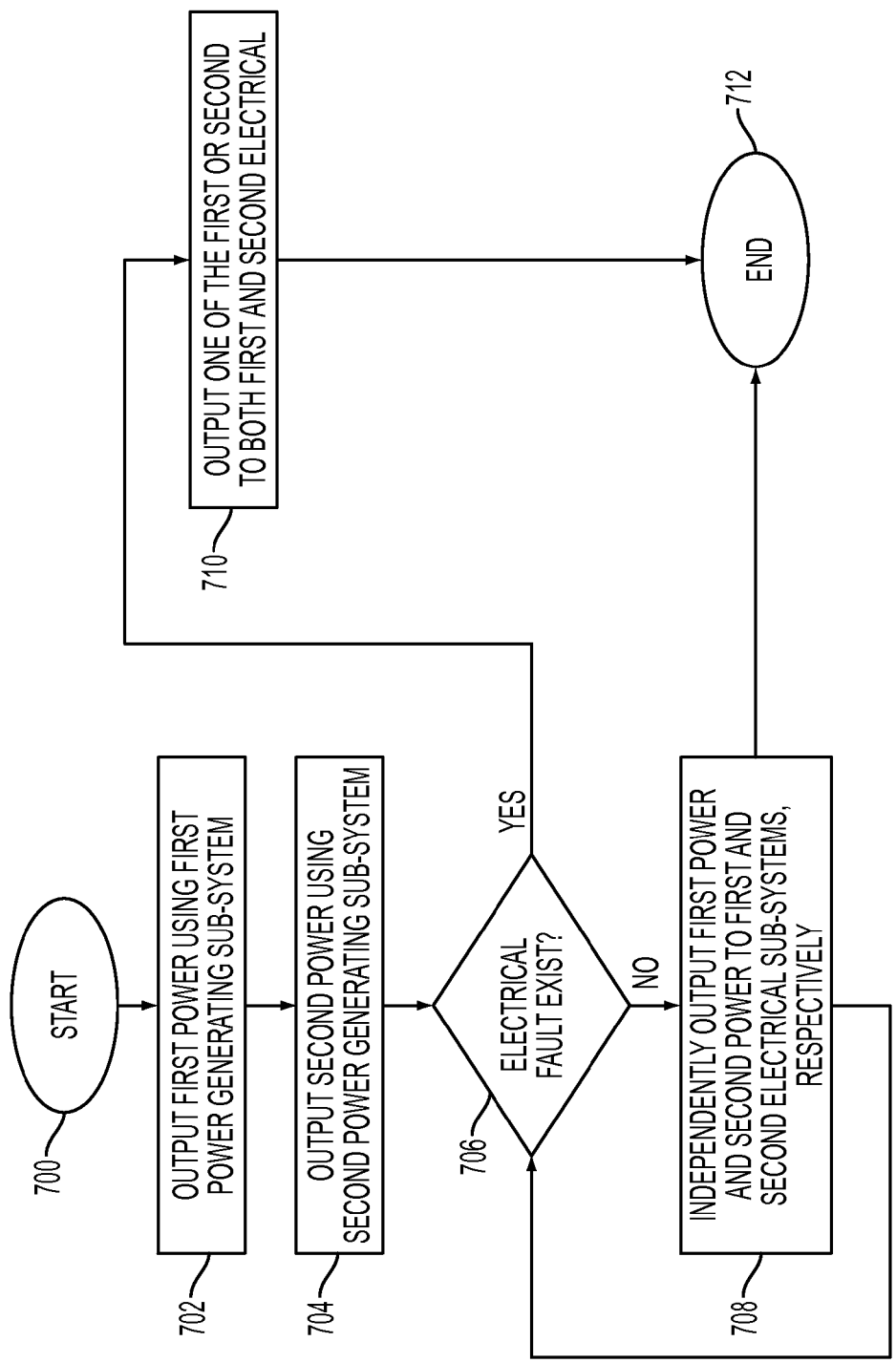
FIG. 7 is a flow diagram illustrating a method of controlling a MEE system according to a non-limiting embodiment of the disclosure.

Turning now to FIG. 7, a flow diagram illustrates a method of controlling a MEE system according to a non-limiting embodiment. The method begins at operation 700, and outputs a first power using a first power generating sub-system at operation 702. At operation 704, second power different from the first power is output using a second power generating sub-system different from the first power generating sub-system. At operation 706, a determination is made as to whether the MEE system contains an electrical fault. If an electrical fault does not exists (e.g., the MEE system is operating normally), the first and second powers are distributed independently to the first and second electrical sub-systems, respectively, at operation 708, and the method returns to operation 706 to continue monitoring for electrical faults. If, however, an electrical fault exists in either the first power generating sub-system or the second power generating sub-system, for example, one of the first or second powers is distributed to both the first and second electrical sub-systems at operation 710, and the method ends at operation 712.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A more-electric engine (MEE) system configured to operate in a plurality of operating modes, the MEE system comprising:
   a first power generating sub-system configured to output electric power to a first power bus, the first power generating sub-system including a first multi-phase switched reluctance starter/generator configured to output the first power signal to the SLMD module;
   a second power generating sub-system different from the first power generating sub-system, and configured to output electric power to a second power bus different from the first power bus, the second power generating sub-system including at least one wound field synchronous generator including a rotating power converter that regulates a main field current, and a multi-phase rectifier that rectifies the output of the rotating power converter to generate the second power signal and outputs the second power signal to the SLMD module; and
   an electronic source/load management and distribution (SLMD) module in power and signal communication with each of the first and second power generating sub-system and a plurality of electrical sub-systems, the electronic SLMD module configured to selectively operate the MEE system in one of a first operating mode or a second operating mode among the plurality of operating modes, the first and second operating modes adjusting the delivery of the first and second electric power to the first and second power buses connected to the plurality of electrical sub-systems,
   wherein the electronic SLMD module distributes the first and second electric power independently to the first and second power buses electrical sub-systems, respectively, in response to initializing the first operating mode, and commonly distributes one of the first or second power to each of the first and second power buses of electrical sub-systems in response to initializing the second operating mode, wherein the SLMD module initializes the first operating mode when a power level of each of the first and second power buses are greater or equal to a power threshold value, and initializes the second operating mode when the power level of at least one of the first and second power buses are less than the power threshold value.

2. The MEE system of claim 1, wherein the electronic SLMD module connects the first power generating sub-system to both the first and second power buses of electrical sub-systems in response to initializing the second operating mode.

3. The MEE system of claim 1, wherein the electronic SLMD module connects the second power generating sub-system to both the first and second power buses of electrical sub-systems in response to initializing the second operating mode.

4. The MEE system of claim 1, wherein the at least one wound field synchronous generator includes a generator armature winding electrically connected to the second power bus, and wherein the multi-phase rectifier is a three-phase rectifier that rectifies AC power at the generator armature winding to generate the electric power.

5. The MEE system of claim 4, wherein the first electrical sub-system controls operation of an engine of an aircraft; and wherein the second electrical sub-system controls a propeller pitch of the aircraft.

6. A method of controlling a more-electric engine (MEE) system, the method comprising:
outputting electric power to a first power bus using a first power generating sub-system, the first power generating sub-system including a first multi-phase switched reluctance starter/generator configured to output electric power to an electronic source/load management and distribution (SLMD) module;
outputting electric power to a second power bus different from the first power bus using a second power generating sub-system different from the first power generating sub-system, the second power generating sub-system including at least one wound field synchronous generator including a rotating power converter that regulates a main field current, and a three-phase rectifier that rectifies AC power at a generator armature winding to generate electric power at the second power bus, the second power bus delivering the electric power from the three-phase rectifier to the SLMD module;
selectively operating the MEE system in one of a first operating mode or a second operating mode among the plurality of operating modes, the first and second operating modes adjusting the delivery of electric power to the first and second power buses that are each connected to respective first and second electrical sub-systems;
distributing electric power to the first and second power buses independently of the first and second electrical sub-systems, respectively, in response to initializing the first operating mode;
distributing electric power to one of the first or second power buses of each of the first and second electrical sub-systems in response to initializing the second operating mode;
initializing the first operating mode when a power level of each of the first and second power buses are greater or equal to a power threshold value; initializing the second operating mode when at least one of the first power signal and second power signal are less than the power threshold value.

7. The method of claim 6, further comprising connecting the first power generating sub-system to both the first and second electrical sub-systems in response to initializing the second operating mode.

8. The method of claim 6, further comprising connecting the second power generating sub-system to both the first and second electrical sub-systems in response to initializing the second operating mode.

9. The MEE system of claim 6, further comprising controlling operation of an engine of an aircraft using the first electrical sub-system controls, and controlling operation of a propeller pitch of the aircraft using the second electrical sub-system controls.

* * * * *